March 1, 1960 D. B. HARRIS 2,927,321

RADIO TRANSMISSION SYSTEMS WITH MODULATABLE PASSIVE RESPONDER

Original Filed Aug. 16, 1952 3 Sheets-Sheet 1

INVENTOR.
DONALD B. HARRIS
BY Marvin Moody
ATTORNEY

March 1, 1960 D. B. HARRIS 2,927,321

RADIO TRANSMISSION SYSTEMS WITH MODULATABLE PASSIVE RESPONDER

Original Filed Aug. 16, 1952 3 Sheets-Sheet 2

INVENTOR.
DONALD B. HARRIS
BY Marvin Moody
ATTORNEY

RADIO TRANSMISSION SYSTEMS WITH MODULATABLE PASSIVE RESPONDER

Original Filed Aug. 16, 1952

INVENTOR.
DONALD B. HARRIS
BY
Marvin Moody
ATTORNEY 2,927,321
Patented Mar. 1, 1960

2,927,321

RADIO TRANSMISSION SYSTEMS WITH MODULATABLE PASSIVE RESPONDER

Donald B. Harris, Palo Alto, Calif.

Continuation of application Serial No. 304,715, August 16, 1952. This application January 26, 1956, Serial No. 561,515

9 Claims. (Cl. 343—178)

This invention relates to radio transmission systems in which one of the stations in communication is designed to be portable, or is otherwise so located as to render its operation from commercial power supplies not feasible, or undesirable.

This application constitutes a continuation of application Serial No. 304,715, filed August 16, 1952 for Radio Transmission Systems, now abandoned.

The subject matter of the instant application is related to my Patent No. 2,607,004 which issued August 12, 1952.

"Walkie-Talkie" radio transmitter-receiver combinations have already come into extensive use in connection with military applications. Existing portable stations of this type all share the disadvantage that they are powered by dry batteries. The necessity for periodically replacing these batteries increases maintenance expenses and renders the equipment unreliable on account of the possibility of battery failure. The additional weight and bulk caused by the batteries is also a disadvantage.

If portable stations of this type were to be operated in large numbers, as, for example, extension stations connected to telephone main stations, or if similar stations were used at a fixed location to serve as regular subscriber telephone stations connected by radio to a central office, the maintenance expense occasioned by the necessary periodical battery replacements would result in uneconomical operation except where specialized applications justifying a high charge for the equipment were involved. In the case of the portable extension station application, the additional weight and bulk of the batteries would cause inconvenience to the subscriber.

The present invention obviates these disadvantages by providing means whereby the portable station receives its transmission power by radio from the fixed station. No power source in the portable station is therefore required, and the batteries are eliminated. As a result the size of the portable station is so reduced that for communication over short distances, the entire apparatus can be accommodated inside the handle of an ordinary telephone handset. This handset handle is a complete self-contained radio transmitter and receiver, has no external connections, and can be carried about the room, or down the street during a conversation.

Five methods of operation are disclosed. In the first, the remotely located station consists of an antenna, tuning circuits or cavities, a rectifier or detector, a conventional telephone receiver, and a telephone transmitter of the dynamic or crystal type adapted to generate its own voice frequency power without the application of power from an external source. Signals from the centrally located station of the system, which may be located at a central office or in a permanent location on the subscriber's premises are "beamed" by means of a parabolic or lens antenna to the remotely located station, which receives them on a dipole antenna. After passing through the tuning system in the remote station the signal, which consists of the carrier and both sidebands, amplitude modulated, is impressed on the detector, rectified, and delivered to the telephone receiver. Transmission in the other direction is accomplished by amplitude modulating at the remote station the carrier received from the central station, and retransmitting it back to the central station, where it is received by another directional antenna connected to a conventional A.M. receiver. At the central station, connection is made to the telephone line through a hybrid coil, or if feedback directly from the fixed transmitter to the fixed receiver can be reduced sufficiently, through a bridging pad.

This method of operation is successful only when the gains in the central transmitter and receiver are sufficiently low as to be less than the losses in the propogation path between the two central antennas. These losses can be increased by employing antennas of high directivity, and locating them as far apart as possible. The transmitter and receiver gains are functions of the distance between the central and remote stations. When this distance becomes too great, the transmitter and receiver gains become greater than the transmission losses between the central transmitter and receiver and singing results.

For greater separations between central and remote stations, the second method of operation is employed. The central transmitter emits a frequency modulated signal, which is demodulated in the remote receiver by means of a discriminator and impressed on the telephone receiver. Transmission from the remote to the central station is accomplished by amplitude modulating, at the remote station, the carrier received from the central station, and retransmitting it to the central station, where it is received by an A.M. receiver, and impressed on the telephone line through a hybrid coil or bridging pad. As F.M. is used for transmitting and A.M. for receiving at the central station, the loss in the transmission path between the central transmitter and receiver is greatly increased, permitting greater separations between the central and remote stations. This distance is further increased by employing highly directional antennas at the central station.

As a variant of the second method, the third method employs amplitude modulation for transmission from the central station to the remote station, and frequency modulation for transmission from the remote station to the central station.

The fourth method employs pulsed techniques. The central station is arranged in a manner similar to a radar set, and is provided with a transmitter adapted to emit modulated pulses of radio frequency energy at an appropriate super-sonic pulse repetition frequency. The central station also is equipped with a sensitive receiver, which by means of a "TR" box, is disabled during the interval when a pulse is being sent by the central transmitter. At the end of each pulse, the TR box opens the path from the antenna to the receiver, placing the central station in position to listen for echoes returning from the remote station. The arrangement of the remote station is similar to that employed in the first method of operation, an antenna, tuning circuit or cavities, detector, telephone receiver and dynamic telephone transmitter being provided. When transmitting from the central station to the remote station, the remote station picks up the modulated pulses emitted by the central transmitter, rectifies them and impresses the resulting audio-frequency on the telephone receiver. Transmission in the other direction is effected by modulating, at the remote station, the pulsed carrier received from the central transmitter, and reradiating it back to the central receiver.

This method of operation has the advantage that singing problems are greatly simplified because the transmitter and receiver at the central station are never in operation at the same time, theoretically increasing the direct feed-back loss between them to infinity. It has the disadvantage that it is inoperable at very short separations between the central and remote stations, unless special arrangements are used, due to the very great propagation velocity of the radio wave.

The fifth method of operation employs amplitude modulation in both directions as in the case of the first method, but increases the loss in the feedback path between the central transmitter and central receiver by employing a harmonic of the wave emitted by the central station, for transmission from the remote station to the central station.

In connection with all five methods, additional feedback suppression may be obtained if needed by transmitting in one direction with horizontal polarization, and in the other direction with vertical polarization. Further improvement in singing may be afforded by feeding back to the central receiver, through a coaxial cable or waveguide, some of the output of the central transmitter in phase opposition to the signal received through the transmission medium. These expedients are illustrated in connection with the first and third methods of operation.

It is an object of my invention to provide a radio transmission system in which one station furnishes, by radio, the transmission power for the other station.

It is another object of my invention to provide a radio transmission system in which a portable, or remotely located station requires no local power source, receiving and demodulating signals from a centrally located station through circuits not requiring local energization, and transmitting signals back to the centrally located station by reradiating a carrier received from the centrally located station.

It is another object of the invention to provide a method of transmission between two stations in which one centrally located station furnishes the radio-frequency power to operate both stations.

It is another object of my invention to provide a method of operating a remotely located station in which the station receives signals from a centrally located station by means of rectifier circuits not requiring local energization, and transmits signals to the centrally located station by modulating and reradiating a carrier wave received from the fixed station.

It is a further object of the invention to provide means whereby, in a transmission system transmitting on the same frequency in two directions, energy received at one station from the transmitter of the same station, is prevented from reaching a telephone line connected to that station at a level sufficiently high as to cause singing or oscillation, through the employment of various expedients, including: the use of amplitude modulation in one direction and frequency modulation in the other direction; the use of high gain antennas at the centrally located station; the use of horizontal polarization in one direction and vertical polarization in the other direction; the employment of pulsed techniques, in which the receiver at the centrally located station is disabled during the intervals when a pulse is being emitted by the centrally located transmitter; and the use of circuits in which a portion of the emission of the centrally located transmitter is fed back to the centrally located receiver in phase opposition to the signal received by the centrally located receiver from the centrally located transmitter through the transmission medium.

It is another object of the invention to provide, in a remotely located radio transmitting and receiving station a method, whereby, by means of a common circuit element, an amplitude modulated signal received from a centrally located station is demodulated, and the carrier wave received from the centrally located station is locally amplitude modulated, for retransmission back to the centrally located station.

It is another object of the invention to provide, in a remotely located radio station, a method whereby a modulated pulsed signal received from a centrally located station is demodulated, and a pulsed carrier received from the centrally located station is amplitude modulated, for retransmission back to the centrally located station.

It is another object of the invention to provide, in a remotely located station, a method whereby a modulated carrier received from a centrally located station is demodulated, and a harmonic of that carrier is modulated, for retransmission back to the centrally located station.

The foregoing and other objects of the invention can best be understood from the following description of exemplifications thereof illustrated in the accompanying drawings, in which.

Figure 3:
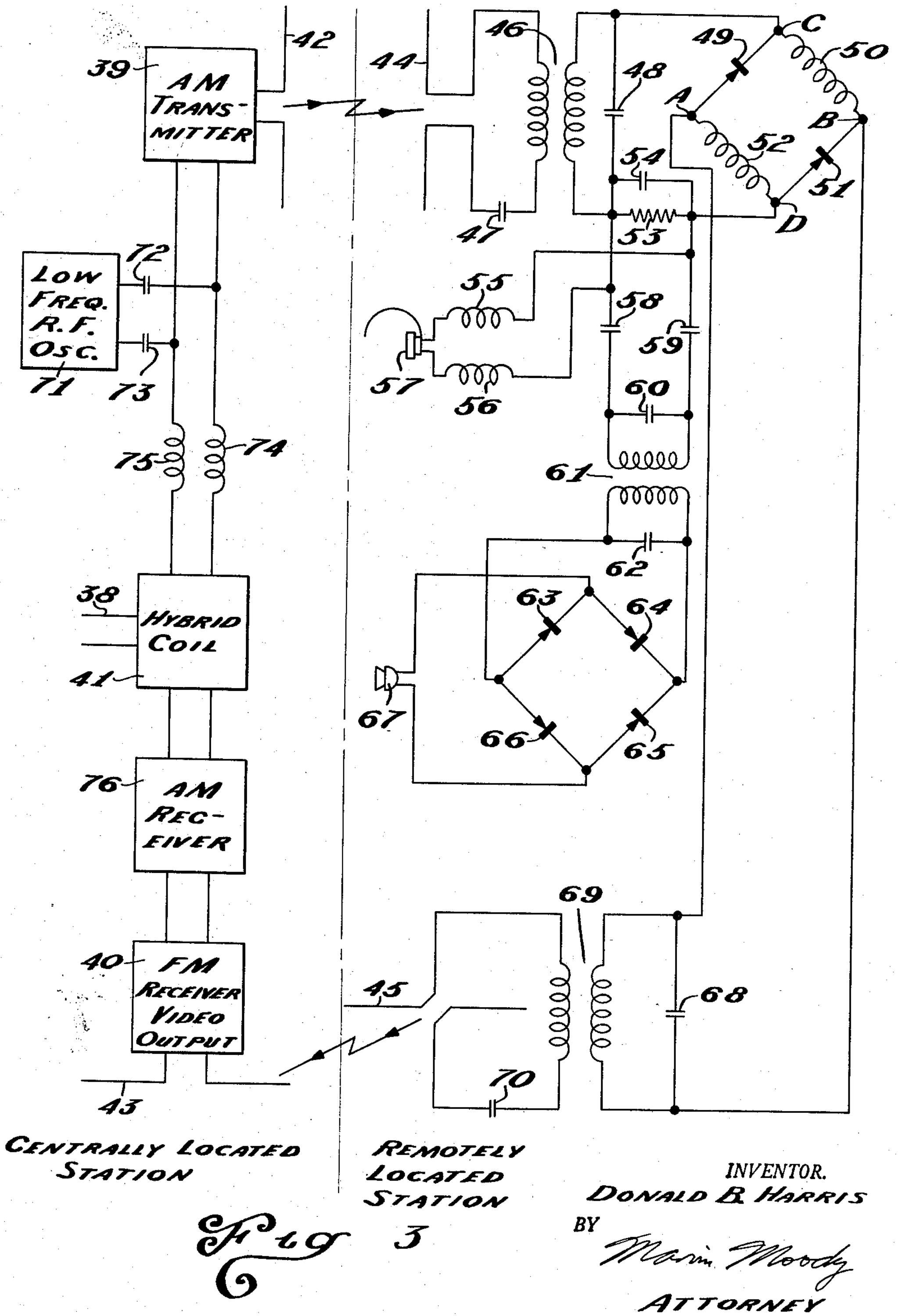

Figure 3 exemplifies in schematic form the third method of operation, which employs amplitude modulation for transmission from the centrally located station to the remotely located station and frequency modulation in the reverse direction.

Figure 4:
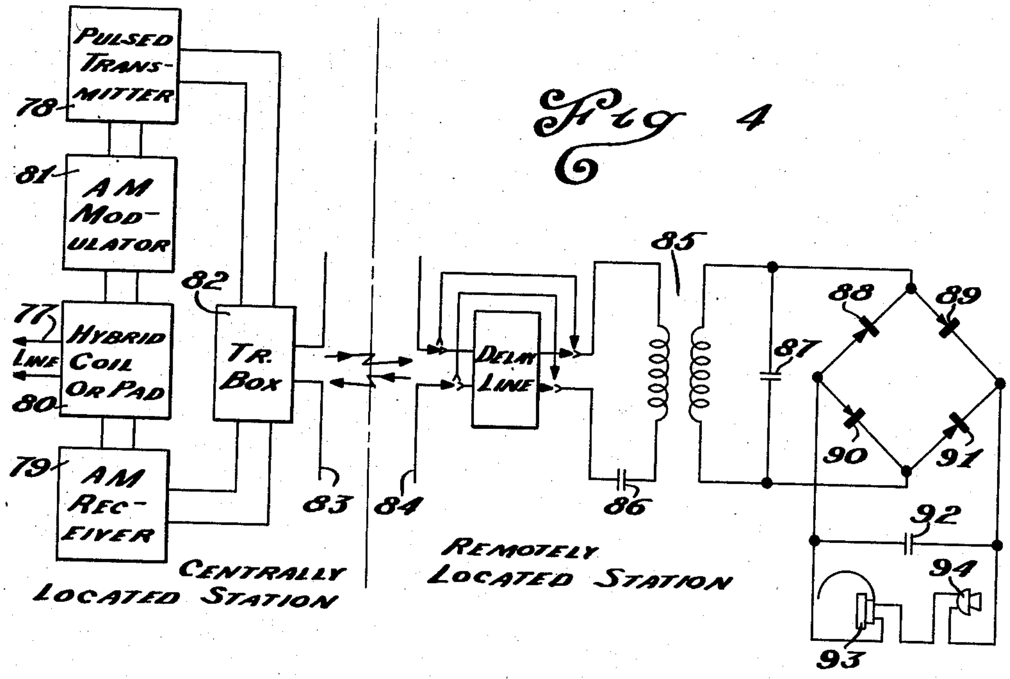

Figure 4 covers the fourth method of operation, which employs a pulsed carrier in both directions of transmission.

Figure 5:
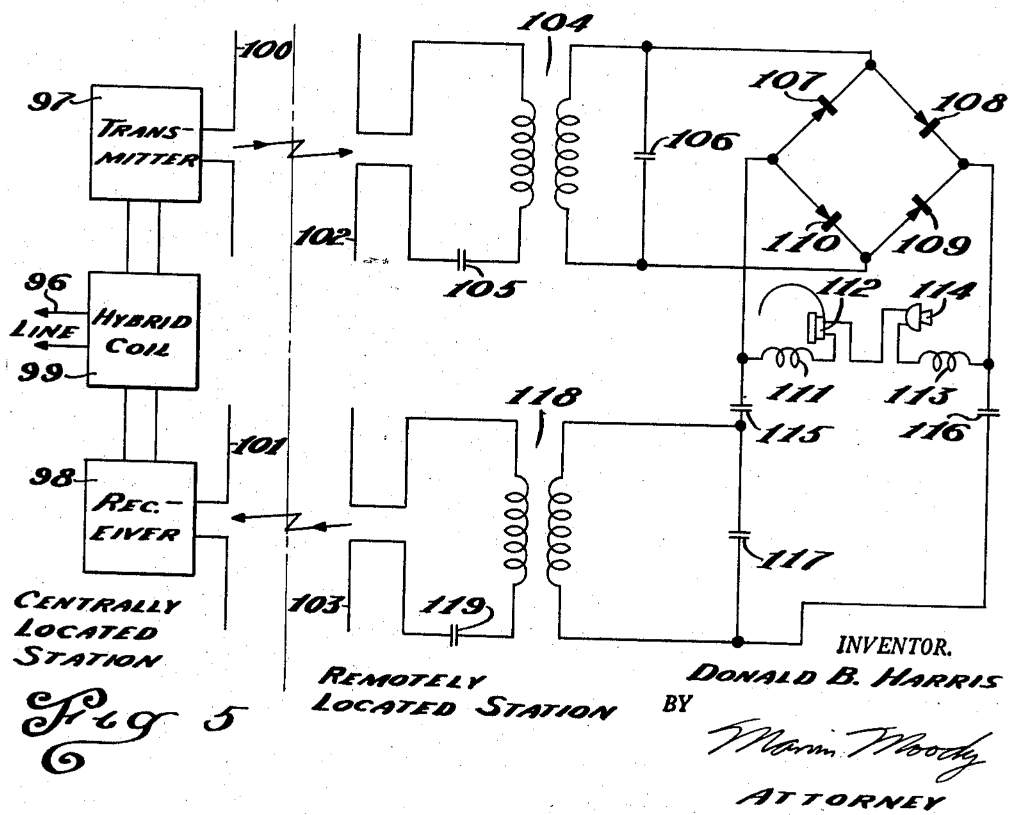

Figure 5 demonstrates, as the fifth method of operation, circuits adapted to transmit from the centrally located station to the remotely located station by means of a modulated carrier, and to transmit in the reverse direction by employing a harmonic of the same carrier wave.

Figure 1:
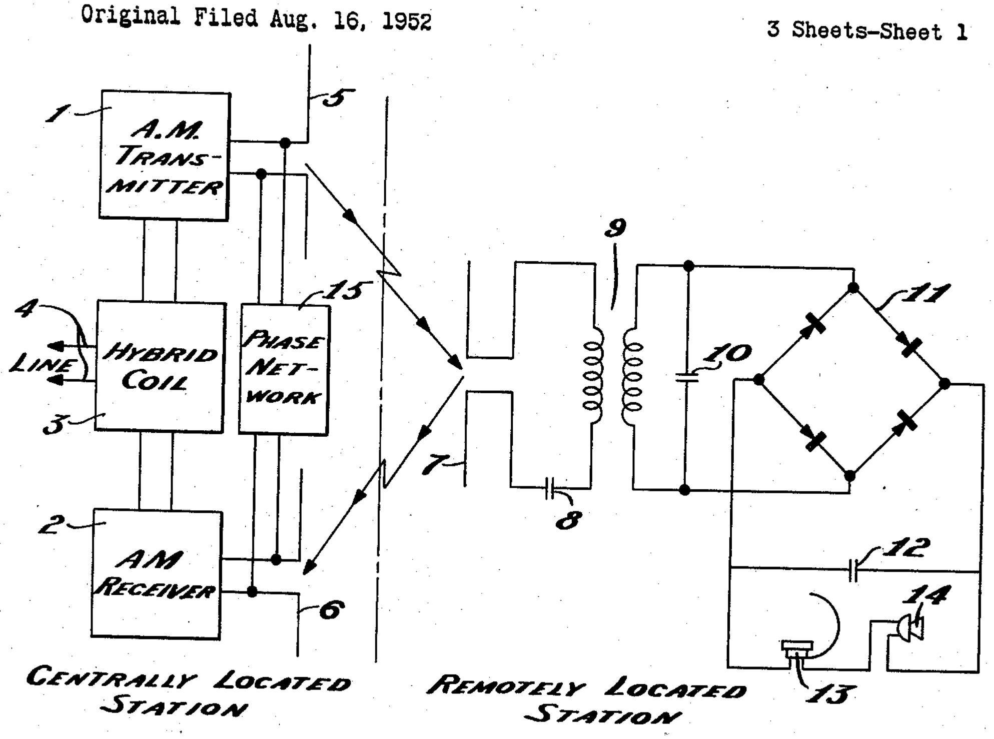
Figure 1 is a schematic diagram indicating the first method of operation, in which transmission in both directions employs amplitude modulation.

In Figure 1, illustrating the use of amplitude modulation in both directions, the equipment at the centrally located station is of conventional type and is accordingly shown in block form only. It comprises the amplitude modulated transmitter 1, the amplitude modulated receiver 2, the hybrid coil 3, and the feedback network 15. In transmitting from the centrally located station to the remote station, alternating currents on the line 4, after passing through the hybrid coil, are impressed on the transmitter 1, and modulate it in the usual manner. Transmitter 1 emits an amplitude modulated wave, which is radiated by transmitting antenna 5. This antenna is shown as a conventional dipole antenna, but is provided with a parabolic reflector, or with other means for creating a highly directional pattern, directed toward the remotely located station. A portion of the transmitter output is fed back to the receiver through line and phase network 15, in phase opposition to the signal received through the transmission medium.

At the remotely located station, the signal is picked up by dipole antenna 7, and impressed on transformer 9, which is tuned to the frequency of the carrier by means of condensers 8 and 10. Where extremely high frequencies are employed, as for example, in the microwave region, elements 8, 9 and 10 will actually take the form of a resonant cavity, but they are here shown as individual circuit elements for clarity.

The received signal is now impressed on demodulator 11, which consists of a number of non-linear elements disposed in an appropriate configuration. A "bridge" configuration is shown, but other arrangements may be employed, and it is not necessary that four elements be used; a single element connected as a conventional "crystal detector" is adequate. The elements of the demodulator, indicated by the arrows and perpendicular bars may be any type of non-linear device capable of responding to the frequencies employed, such as, for example, a silicon crystal with a catwhisker in contact.

Demodulator 11 rectifies, or demodulates the received signal in the conventional manner, and the resultant audio voltage is impressed on telephone receiver 13, which thus reproduces for the listener at the remotely located station, the original modulation received from the line at the centrally located station. Condenser 12 bypasses the high frequency components which have passed through the demodulator.

When transmitting from the remotely located station, the modulation originating at the line is of course absent, because the individual at the far end of the line is listening for a response from the remotely located station, and is not talking. Under these conditions, a steady, unmodulated carrier is received at the remotely located station, and is impressed on demodulator 11. When the individual at the remotely located station now talks into microphone 14, demodulator 11 becomes a modulator. Microphone 14 is of the "dynamic" type, in the sense that it generates its own voltages without requiring an external power supply. These voltages, which are proportional to the variations in the speech of the talker are impressed on modulator-demodulator 11, which, in the well-known manner of modulators, imparts amplitude modulation to the carrier. The modulated carrier is now transmitted back through cavity 8, 9, 10 and impressed on antenna 7, where it is reradiated.

At the centrally located station, the reradiated carrier, now modulated by the talker at the remotely located station, is picked up by receiving dipole antenna 6, which, like antenna 5, is provided with reflectors or lenses and is highly directional. The signal is impressed on receiver 2, which amplifies it, demodulates it, and delivers it to hybrid coil 3. This hybrid coil functions as a "bridge" device in the well-known manner of hybrid coils and prevents the signal from setting up a singing path by passing through to transmitter 1, but impresses the audio output of the receiver with very little attenuation on the line 4, which transmits it to the listener at the far end of the line. Transmission in the reverse direction is thus accomplished.

The method of Figure 1 is effective over distances between the centrally located station and the remotely located station of the order of 100 yards, using a centrally located transmitter with a power output of approximately 25 watts, at a frequency of 3000 megacycles. In order to obtain this result, parabolic antennas having gains of approximately 40 db in the major lobe are used at the centrally located transmitter 1 and receiver 2, and these antennas are so located with respect to each other that the loss between them through the transmission medium is approximately 100 db. An additional 20 db of feedback suppression is realized through negative feedback, producing a net loss of 120 db between the centrally located transmitter 1 and receiver 2. At a separation of 100 yards between the centrally located and remotely located stations, there is a loss of about 50 db between the stations, from the output of transmitter 1 to the telephone receiver 13 in the remotely located station, including the antenna gains and the conversion losses in the demodulator. As the transmitting level of the centrally located station is about +45 db with respect to 1 milliwatt, the signal arrives at the telephone receiver at a level of about −5 dbm, adequate for satisfactory conversation. When transmitting in the reverse direction, a similar loss of 50 db exists between the dynamic microphone 14 in the remotely located station and the input to the receiver 3, at the centrally located station. The "round trip" loss from the centrally located transmitting antenna 5 to the remotely located station and return is thus about 100 db, requiring that the sum of the gains in the centrally located transmitter and receiver also be approximately 100 db. The loss through the transmission medium to that part of the radiated energy transmitted directly between them is, however, as has already been pointed out, 120 db. Since the sum of the transmitter and receiver gains is less than this figure, singing does not result.

When the distance between the centrally located station and the remotely located station exceeds a few hundred yards, the loss in the transmission path becomes greater than 60 db in each direction. If the gains in the transmitter 1 and receiver 2 are increased to offset this loss their sum becomes greater than the loss, 120 db, in the direct path between transmitter 1 and receiver 2, and singing ensues. In order to operate at greater distances it is therefore necessary to increase the loss in the direct transmission path between 1 and 2. In some installations it is possible to accomplish this result by increasing the separation between antennas 5 and 6, but in general this is not a satisfactory solution, and other means of increasing the loss must be found.

Figure 2:
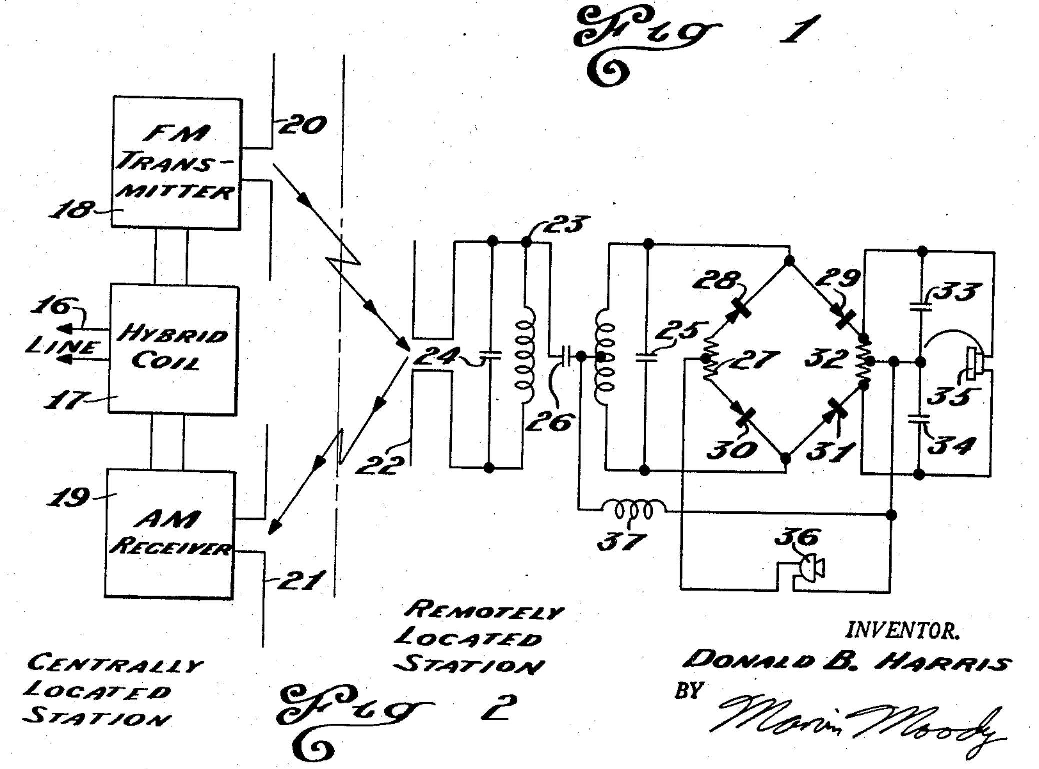
Figure 2 is a schematic diagram of the second method of operation, in which frequency modulation is employed for transmission from the centrally located station to the remotely located station, while amplitude modulation is employed in the reverse direction.

Figure 2 shows a method of operation in which the direct loss between the centrally located transmitter and receiver is increased through the use of frequency modulation for transmission from the central to the remote station, and amplitude moduation for transmission in the reverse direction. In the figure, audio voltages on line 16 are impressed on FM transmitter 18 through hybrid coil 17. Transmitting dipole antenna 20, which is provided with reflectors or lenses as required radiates an FM signal to antenna 22 at the remotely located station, which impresses it on the primary of transformer 23, tuned to the frequency of the carrier by means of condenser 24. Transformer 23, together with tuning condensers 24, 25, coupling condenser 26, non-linear elements 29 and 31 of the bridge circuit, resistance 32 and radio-frequency choke 37, functions as a conventional FM discriminator. Demodulation is therefore carried out in the well known manner of discriminators, and the voltage which appears across resistor 32 follows the original modulation on line 16. Bypass condensers 33 and 34 remove the residual radio-frequency which has passed through the discriminator, and the audio voltage is impressed on receiver 35.

When transmitting in the reverse direction, non linear elements 28, 29, 30 and 31 act as an AM modulator. The unmodulated carrier standing on the terminals of the bridge is thus amplitude modulated by the voltages generated by dynamic microphone 36, and the resultant modulated wave is transmitted back through transformer 23 and radiated by antenna 22 back to the centrally located station where it is picked up by directional receiving antenna 21, amplified and demodulated by AM receiver 19, and impressed on line 16 through hybrid coil 17.

Since transmitter 18 emits an FM signal and receiver 19 receives only amplitude modulation the loss in the direct transmission path between them is theoretically infinity. Actually, due to imperfections in the FM signal, a certain amount of amplitude modulation is present, so that only about 60 db of suppression may be realized from the FM-AM arrangement. The total loss in the direct path between transmitter 18 and receiver 19 is thus about 160 db, permitting operation of the remotely located station at distances giving a loss of about 80 db between the output of transmitter 18 and receiver 35 in the remotely located station. Such losses are obtained at distances of about 2.5 miles, taking into account a conversion loss of 10 db in the modulator-demodulator of the remotely located station, and an antenna gain of 40 db in each antenna of the centrally located station. The operation of method 2 is therefore satisfactory up to about 2.5 miles.

Operation at still greater distances may be effected by employing the method of Figure 3, in which amplitude modulation is used for transmission from the centrally located station, and frequency modulation for transmission in the reverse direction. In addition to retaining the 60 db suppression available from the use of the FM-AM combination, this method realizes further suppression from the use of horizontal polarization in one direction, and vertical polarization in the other direction. Operation is in accordance with the following outline:

Audio voltages on line 38 are impressed on conventional AM transmitter, 39 through hybird coil 41 and radio-frequency chokes 74 and 75. Transmitter 39 emits an AM signal which is radiated by directional antenna 42, picked up at the remotely located station by antenna 44, and impressed on transformer 46, tuned to the frequency of the carrier by condensers 47 and 48. At the output of the transformer, the AM wave passes in series through condenser 54, which has a very low impedance at the carrier frequency, and elements 50 and 51, in parallel with elements 49 and 52 of the bridge network. Elements 49 and 51 are non-linear resistors, and elements 50 and 52 are inductances having nominal reactances at carrier frequencies but negligible reactances at audio frequencies. The bridge network therefore acts as an AM demodulator with respect to currents passing through the circuit in series, with the result that audio voltages identical with the original modulation on line 38 are set up across resistance 53. These audio voltages are impressed on receiver 57, through radio frequency chokes 55 and 56, which serve to prevent radio frequency currents from passing into the receiver. Transmission from the centrally located station to the remotely located station is thus effected.

Considering transmission in the other direction, it is necessary to return for a moment to the centrally located station. In addition to the modulation receiver from line 38, transmitter 39 is continuously modulated by a wave of relatively low radio frequency, derived from low-frequency RF oscillator 71 and impressed on transmitter 39 through coupling condensers 72 and 73. These coupling condensers have a relatively low impedance at radio frequencies, and accordingly pass the low frequency RF wave with relatively little attenuation.

On the other hand, they have a high impedance at audio frequencies, and therefore prevent audio voltages coming from line 38 from passing into oscillator 71, thereby eliminating any shunting effect on the audio-voltages which might otherwise result from oscillator 71. RF chokes 74 and 75 prevent the low frequency RF wave from being shunted out by the hybird coil.

The low frequency RF modulation, which may have a frequency of about 1 megacycle if the carrier has a frequency of 3000 megacycles, thus modulates transmitter 39, emission from which is radiated by antenna 42, picked up by antenna 44, resonated by transformer 46, condenser 47, and condenser 48, and rectified by demodulator 49, 50, 51, 52. The 1 megacycle wave therefore also stands across resistor 53, together with the audio frequency voltages already described. Negligible attenuation is caused by condenser 54, which has a relatively high impedance at 1 megacycle.

RF chokes 55 and 56 prevent the receiver 57 from shunting out the 1 megacycle wave and condensers 58 and 59, having a high impedance at audio frequencies, prevent transformer 61 from shunting out the audio-frequency.

The 1 megacycle wave passes through condensers 58 and 59, which have a low impedance at 1 megacycle, and is impressed on modulator 63, 64, 65, and 66 through transformer 61, which is tuned to 1 megacycle by condensers 60 and 62. The 1 megacycle wave thus stands on the horizontal terminals of the modulator at all times. When, now the talker at the remotely located station talks into dynamic transmitter 67, the audio voltages generated by the transmitter, and impressed on the vertical terminals of the modulator, amplitude modulate the 1 megacycle wave in the conventional manner. The resultant amplitude modulated wave now travels back through transformer 61, condensers 58 and 59 and is impressed on the vertical terminals CD of modulator 49, 50, 51 and 52 in series with the secondary winding of transformer 46, which has a low impedance at 1 megacycle.

It is to be noted that at this same time, the 3000 megacycle wave received from the centrally located station is also standing on the vertical terminals CD of modulator 49, 50, 51 and 52. Modulator 49, 50, 51 and 52 now brings about frequency modulation of the 3000 megacycle wave by the amplitude modulated 1 megacycle wave, in accordance with the following analysis:

Assume that the R.M.S. voltage of the 3000 megacycle wave standing across the vertical terminals CD of modulation 49, 50, 51 and 52 is $E_0$. Then the voltage on terminal A with respect to terminal D is $$E_A=\left[\frac{jx}{R+jx}\right]E_0 \qquad (1)$$

Where R is the resistance of element 49 and X is the reactance of inductance 52.

Inductance 50 also has a reactance X, and element 51 a resistance R. Then the voltage on terminal B with respect to terminal D is $$E_B=\left[\frac{R}{R+jx}\right]E_0 \qquad (2)$$

and the voltage at terminals AB across the line to the transmitting antenna 45 is $$E_L=E_B-E_A=\left[\frac{R-jx}{R+jx}\right]E_0 \qquad (3)$$

Expressing both numerator and denominator of the expression in polar form we obtain:

$$E_L=\left[\frac{\sqrt{R^2+X^2}\angle\tan^{-1}-\frac{X}{R}}{\sqrt{R^2+X^2}\angle\tan^{-1}\frac{X}{R}}\right]E_0$$

$$=\left[1\angle\tan^{-1}-\frac{X}{R}-\tan^{-1}\frac{X}{R}\right]E_0$$

$$=E_0\angle 2\tan^{-1}\frac{X}{R} \qquad (4)$$

The fundamental nature of the principle expressed by Equations 3 and 4 is illustrated in sheet 4 of the drawings of my above-mentioned patent. This figure shows four sets of vectors representing the individual components of Equation 3 together with the resultant vector at the output of the modulator for various values of R. In each case vector OA represents the numerator $(R-jx)$, vector OB the denominator $(R+jx)$ and vector OC the resultant $(R-jx)/(R+jx)$. Referring to Figure 6A of my above-mentioned patent, which illustrates the cndition when $R=0$ and $X=.4$, it is seen that, since OA and OB are equal in length the modulus or length of their quotient vector OC is unity. The angle or argument of OC is, however equal to the difference between the angle of OA and the angle of OB, or in this case, $(-90°-90°)=-180°$.

As the value of R increases somewhat, we obtain a condition similar to that illustrated by Figure 6B of my above-mentioned patent, where $R=.4$ and $X=.4$. Here it is seen that as in the former case the length of the resultant vector is still unity, OA and OB still being equal in length, but the angle of OC is now $(-45°-45°)=-90°$.

When R becomes equal to 1.0, X remaining constant at .4, the condition of Figure 6C of my above-mentioned patent prevails. The length of OC is still 1, but its angle is now $(-21° 48'-21° 48')=-43° 36'$.

The scale of Fig. 6D of my above-mentioned patent has been exaggerated in order to show the condition when R becomes large with respect to X. Here R is 10.0, X retaining its constant value of 0.4. It is seen that, as OA and OB are still equal in length, the magnitude of OC continues to be unity, but its angle is now $(-2° 18'-2° 18')=-4° 36'$. If R becomes infinitely large, it is evident that the value of OC will be 1.

$\angle 0$

It is to be observed that although Equations 3 and 4 assume equal values for the resistances and equal values for the reactances in the opposite arms of the bridge, a more general requirement is merely that they be proportional. For, if we represent the resistance of element 49 as $R_{49}$, the resistance of element 51 as $R_{51}$, the inductance of element 50 as $X_{50}$ and the inductance of element 52 as $X_{52}$, it is seen that the resultant vector delivered at the output of the modulator will have a constant length or modulus, if:

$$\frac{R_{49}}{R_{51}}=\frac{X_{50}}{X_{52}} \qquad (5)$$

or $$\frac{R_{49}}{X_{50}}=\frac{R_{51}}{X_{52}} \qquad (6)$$

It is also noted that the resistance elements 49 and 51 need not necessarily be silicon crystals or other non-linear devices. The only requirement is that their value must be capable of being varied in proportion to the modulating voltage. In other applications, they might, therefore be the plate circuits of a pair of vacuum tubes, in which the grid is connected to the modulating voltage; or some similar device.

It is thus seen that the magnitude of the voltage delivered to transmitting antenna 45 is at all times equal to the impressed carrier voltage, but its phase angle is displaced with respect to the carrier voltage by an amount, $$-2\tan^{-1}\frac{X}{R}$$

varying from −180° to 0 degrees as R varies from zero to infinity. It is also seen that this result is brought about through dividing two vectors of equal length having angles of equal numerical value but opposite in sign, to give, for the output of the modulator, a vector of unit constant length, but having a negative angle equal in value to twice the value of the angle of either of the component vectors.

Now the resistance, R, of non-linear elements 49 and 51, is a function of the modulating voltage derived from the amplitude modulation of the 1 mc. wave by transmitter 67. If we represent the instantaneous value of this modulating voltage as $e_m$, we may say that $$R=f(e_m) \qquad (7)$$

The exact nature of this function may be somewhat complex in the case of available non-linear elements. We may, however, idealize the relationship for the sake of discussion, to assume that:

$$R=a\cot\frac{e_m}{2} \qquad (8)$$

where $a$ is a constant.

Then, substituting (8) in (4) we obtain:

$$E_L=E_0\left\backslash 2\tan^{-1}\frac{X}{a\cot\frac{e_m}{2}}\right.$$

$$=E_0\left\backslash 2\tan^{-1}\frac{X}{a}\tan\frac{e_m}{2}\right. \qquad (9)$$

and if $a=X$, $$E_L=E_0\left\backslash 2\tan^{-1}\tan\frac{e_m}{2}\right.$$

$$=E_0\backslash e_m \qquad (10)$$

Under these idealized conditions it is seen that perfect phase modulation is obtained: in other words, the voltage delivered to transmitting antenna 45 remains constant in magnitude, but has a phase angle which is a linear function of the modulating voltage $e_m$. Expressing the transmitted voltage in instantaneous form, we have:

$$e_L=E_0[\sin(\omega t-e_m)] \qquad (11)$$

Where $e_L$ is the instantaneous value of the voltage across terminals AB, $\omega=2\pi$ times the frequency of the carrier, and $t$ is time.

In practice, it is possible, by properly choosing circuit constants and operating points, to approximate the requirements of Equation 8 over a limited operating range, such that the maximum phase deviation obtainable is of the order of ±0.2 to ±0.5 radians.

Now the value of $e_m$, by definition of the value of an amplitude modulated wave is $$e_m=E_p[1+mf(t)]\sin pt \qquad (12)$$

Where $E_p$ is the maximum amplitude of the low frequency RF wave, unmodulated, $m$ is the modulation index, $f(t)$ is the instantaneous value of the modulating audio voltage, and $p=2\pi$ times the frequency of the low frequency RF wave, 1 megacycle. Substituting (12) in (11), we obtain, for the complete expression representing the transmitted wave, $$e_L=E_0\{\sin[\omega t-E_p[1+mf(t)]\sin pt]\} \qquad (13)$$

Analyzing this expression, if we assume that the 1 megacycle wave is completely modulated, $mf(t)$ being unity when $f(t)$ is a maximum, we find the value of the wave for maximum values of $f(t)$ is:

$$e_L=E_0\{\sin[\omega t-2E_p\sin pt]\} \qquad (14)$$

Now in order to satisfy the conditions of Equation 8, $2E_p\sin pt$ must never exceed 0.5 radian in value. Therefore, we have:

$$2E_p<0.5$$

$$E_p<0.25$$

for the maximum values of $f(t)$ (12) becomes $$e_L=E_0\{\sin[\omega t-0.50\sin pt]\} \qquad (15)$$

It is now required to determine the amount of frequency deviation which will result from a phase deviation of this magnitude. It is well known that phase deviation and frequency deviation are related by the expression:

$$\partial\omega=\frac{d}{dt}\partial\phi \qquad (16)$$

where $\partial\omega$ is $2\pi$ times the instantaneous frequency deviation, and $\partial\phi$ is the instantaneous phase deviation. In this case, $$\partial\phi=0.50\sin pt \qquad (17)$$

Therefore $$\partial\omega=\frac{d}{dt}(0.50\sin pt)=0.50\,p\cos pt \qquad (18)$$

and the maximum frequency deviation, that is, the deviation when both $f(t)$ and $\sin pt$ are at maximum, is:

$$\Delta f_e=\frac{\Delta\omega}{2\pi}=\frac{0.50p}{2\pi}$$

$$=\frac{0.50(2\pi f_p)}{2\pi}$$

$$=0.50f_p \qquad (19)$$

where $fp$ is the frequency of the low frequency RF wave, 1 megacycle. Equation 17 shows that the maximum frequency deviation under the conditions chosen is $$\Delta f_e=0.50\times10^6=500{,}000\text{ c.p.s.} \qquad (20)$$

This deviation is, of course, the greatest possible deviation from the condition when the carrier is unmodulated and may be either positive or negative. We may therefore say that, in this case, $$\Delta f_e=\pm500{,}000\text{ c.p.s.} \qquad (21)$$

and the total swing from one extreme to the other is 1 megacycle. A deviation of this magnitude is ample to produce effective frequency modulation of the 3000 megacycle carrier and override noise due to oscillator instability, etc. It is to be observed that this result is obtained only through pre-modulation of the 1 megacycle wave on an amplitude basis; if the audio voltage were to be impressed directly on the modulator 49, 50, 51, 52, a deviation of approximately 3000×.5=1500 cycles would be obtained, entirely inadequate for the purpose.

Returning to Figure 3 the frequency modulated wave is now impressed on transformer 69, which is tuned to the frequency of the carrier by condensers 68 and 70, and is then radiated, with horizontal polarization, by antenna 45. At the centrally located station, the signal is picked up by directional antenna 43, and amplified and demodulated by receiver 40. This receiver is an FM receiver of conventional design, except that its output circuits are designed to pass video frequencies as high as 1 megacycle. The output of this receiver is therefore identical with the amplitude modulated 1 megacycle wave generated in the remotely located station by modulator 63, 64, 65, 66. This output is now impressed on AM receiver 76, which amplifies the signal, demodulates it, and transmits the resulting audio voltage to line 38 through hybrid coil 41.

Due to additional suppression in the amount of about 40 db realized through the use of different polarizations in the two directions of transmission, the direct loss between transmitter 39 and receiver 40 in Figure 3 is about 200 db. Gains of approximately 100 db in each direction of transmission may therefore be employed, giving a maximum distance of about 25 miles between the centrally located station and the remotely located station, taking into account antenna gains of 40 db and conversion losses of 10 db in each direction.

Figure 4 demonstrates another method of obtaining greater ranges, by means of pulsed techniques. In this figure, audio voltages on line 77 are impressed through hybrid coil 80 on AM modulator 81 which, together with pulsed transmitter 78, comprises a conventional amplitude modulated pulsed transmitter. Pulses emitted by transmitter 78, the amplitudes of which are therefore proportional to the audio voltages on line 77, are impressed on "TR" or "Transmit-Receiver" box 82, which, in the well known manner of TR boxes, blocks the path to receiver 79, during intervals when a pulse is being emitted, but transmits these pulses to directional antenna 83 with very little attenuation. Antenna 83 radiates the amplitude-modulated pulsed wave to the remotely located station, where it is picked up by antenna 84, and transmitted to AM demodulator 88, 89, 90, 91 through transformer 85, tuned to the frequency of the carrier by condensers 86 and 87. Demodulator 88, 89, 90, 91, rectifies the wave in the usual manner, and impresses the resultant audio voltage on receiver 93, in series with transmitter 94. Condenser 92 by-passes high frequency components delivered by the demodulator, but has a high impedance to audio frequencies.

When transmitting in the opposite direction, audio voltages generated by dynamic transmitter 94 are impressed, in series with receiver 93, on the horizontal terminals of demodulator 88, 89, 90, 91, which now acts as a modulator, amplitude modulating the pulsed carrier standing on its vertical terminals. Condenser 92, having a high impedance at audio frequencies, has a negligible shunting effect on the modulating voltages. The resultant amplitude modulated pulsed carrier is transmitted through transformer 85 to antenna 84, where it is radiated back to the centrally located station.

Due to the finite propagation velocity of a radio wave, the path to the receiver is open by the time the wave reaches the centrally located station, the TR box having functioned in the usual manner to reestablish the circuit at the end of the transmitted pulse. The wave is therefore picked up by antenna 83, amplified and demodulated by AM receiver 79, and delivered to line 77 through hybrid coil 80.

This method of operation is theoretically effective at maximum distances limited only by the possible length of the line of sight transmission path, since the TR box increases the loss in the feedback path between transmitter 78 and receiver 79, to infinity, permitting the theoretical employment of infinite gains in transmitter 78 and receiver 79.

There is, however, a minimum distance under which two way transmission cannot be carried on, due to the finite length of time required for the TR box to open the path to the receiver following the emission of a pulse. At such short distances, the "reflected" wave, traveling back from the remotely located station, reaches the centrally located station before the TR box has opened the path to the receiver, and is therefore ineffectively dissipated in the TR box. These minimum distances are of the order of a few hundred yards, depending upon the pulse length and the construction of the TR box. This limitation may therefore not be important where the principal requirement is for transmission over considerable distances. Where operation below the minimum distance is required, it may be effected by employing the expedient of delay line 95, indicated as optional in Figure 4 by the dotted lines. This delay line, inserted in the transmitting and receiving path, retards the pulse sufficiently to effect its arrival at the centrally located station after the path to the receiver has been opened, even where short distances are involved. A delay line having a delay of the order of 1 microsecond will in general make it possible to carry on transmission over a distance of only a few yards.

Another method of obtaining transmission at distances up to about 25 miles is illustrated by Figure 5. In this figure, audio voltages on line 96 are delivered by hybrid coil 99 to transmitter 97, which emits an amplitude-modulated signal radiated by directional antenna 100. At the remotely located station this signal is picked up by antenna 102, and transmitted to demodulator 107, 108, 109, 110 by transformer 104, which is tuned to the frequency of the carrier by condensers 105 and 106. Demodulator 107, 108, 109, 110 rectifies the signal in the usual manner and delivers the audio output to receiver 112 in series with radio-frequency chokes 111 and 113, and dynamic transmitter 114.

When transmitting in the other direction, voltages generated by dynamic transmitter 114 are applied to the horizontal terminals of demodulator 107, 108, 109, 110 through RF chokes 111 and 113 and receiver 112. Condensers 115 and 116, which have a high impedance at low frequencies, prevent the audio frequencies from being shunted out by transformer 118. Demodulator 107, 108, 109, 110 now acts as a modulator. Due to the non-linear characteristic of its elements, it generates harmonics of the carrier wave standing on its vertical terminals. Harmonic voltages therefore exist across its horizontal terminals. The audio frequency voltages generated by transmitter 114 amplitude-modulate these harmonics and the resultant amplitude-modulated wave is delivered through condensers 115 and 116, which have a low impedance at radio-frequencies, to transformer 118. Transformer 118 is tuned to one of the harmonic frequencies by condensers 117 and 118. This resonant circuit passes the modulated harmonic on to antenna 103, where it is radiated back to the centrally located station, but suppresses the fundamental, and all other harmonics.

At the centrally located station, the wave is picked up by antenna 101, amplified and demodulated by AM receiver 98, which is tuned to the harmonic, and delivered to line 96 by hybrid coil 99.

Since receiver 98 is tuned to a harmonic of the frequency emitted by transmitter 97, the direct loss between them is very high, and the use of method 5 affords operation over considerable distance. In addition to attenuations of the order of 100 db due to the directional characteristics of antennas 100 and 101, the selectivity of receiver 98 contributes another 100 db to the direct loss. The total loss between transmitter 97 and receiver 98 is therefore of the order of 200 db, permitting the employment of gains of 100 db in each direction, and effecting operation at distances up to 25 miles, as in the case of methods 3 and 4.

In general, it should be observed that in the case of all five methods of operation, the carrier wave emitted by the central station or its harmonic is reradiated by the distant station, and is therefore received by the receiver at the central station, whether or not modulation is applied at the distant station. Where methods 1, 2, 4, or 5 are employed, modulation applied at the central station is also received back at the central station via the distant station. These effects are useful in providing an indication that the distant station is in proper operating condition, and in other ways; they do, however, impose a requirement that the modulation level applied at the distant station shall be greater than the demodulated audio frequency level received at that same point from the central station, in order to avoid singing.

The various instrumentalities utilized in the structure of Figures 1 to 5 for the purpose of effecting transmission between the stations and improving the singing characteristics of the system may, of course, be used in combinations other than those specifically disclosed. For example, a negative feed back line between the central transmitter and receiver may be used in any of the methods of operation to neutralize the effect of waves transmitted directly from the central transmitter to the central receiver through the transmission medium. The hybrid coil, another means of reducing feedback, is shown in all five embodiments of the invention, but may be dispensed with if the gains in the central transmitter and receiver are much lower than the losses in the transmission path between them. In Figure 3, reference has been made to the use of horizontal polarization for transmission in one direction and vertical polarization for transmission in the other direction. These polarizations are, however, not necessarily vertical and horizontal, but may be any polarizations mutually at right angles; and this expedient may be employed in connection with any of the methods of operation. It is therefore not intended that the disclosure of any given specific expedient in connection with any one particular method of operation shall be construed to restrict the use of that expedient to that method only; and in general various combinations of the instrumentalities disclosed, departing far from the specific examples illustrated, may be made without, however, departing from the broad principles of the invention, which I hereby claim, as follows.

What is claimed is:

1. A two-way radio transmission system including a powered central station and a distant station having no primary source of power, said central station comprising a pulsed amplitude-modulated transmitter, a receiver, and means for disabling said receiver during the intervals when energy is being emitted by said transmitter; said distant station comprising a receiver, and a demodulator-modulator for remodulating the energy received from said central station and for retransmitting said remodulated energy back to said central station, the power for operation of said distant station being substantially entirely derived from the energy received from said powered central station.

2. A radio transmission system including a powered central station and a distant station having no primary source of power, said central station comprising a pulsed amplitude-modulated transmitter, a receiver, and means for disabling said receiver during the intervals when energy is being emitted by said transmitter, and a hybrid coil; said distant station comprising a transceiver including tuning elements, a bridge-type demodulator-modulator, a telephone receiver and a dynamic telephone transmitter, said demodulator-modulator being connected to receive and demodulate the energy transmitted from said central station, to remodulate said energy, and to retransmit said remodulated energy back to said central station, the power for operation of said distant station being substantially entirely derived from the energy received from said powered central station.

3. In a two-way radio communication system, the combination of a central station and a distant station, said central station comprising a pulsed amplitude modulated transmitter, a receiver, and means for disabling said receiver during the intervals when energy is being emitted by said transmitter and an antenna; said distant station comprising an antenna, a telephone receiver and a dynamic transmitter, and means including a bridge rectifier circuit for demodulating the energy received at said distant station and for remodulating said energy, said antenna being arranged for retransmitting said remodulated energy back to said central station.

4. In a two-way radio transmission system, a central station comprising a pulsed amplitude-modulated transmitter, a receiver, and means for disabling said receiver during the intervals when energy is being emitted by said transmitter; and a distant station comprising a receiver, and a modulator connected to remodulate said energy received from said central station, the power for operation of said distant station being substantially entirely derived from the energy received from said central station.

5. A two-way radio communication system including a central station and a distant station, said central station comprising a pulsed amplitude-modulated transmitter, a receiver, and means for disabling said receiver during the intervals when energy is being emitted by said transmitter; said distant station comprising a receiver, a dynamic transmitter, and a modulator connected to remodulate the energy received from said central station for retransmitting said energy back to said central station, the power for operation of said distant station being substantially entirely derived from said central station.

6. A radio transmission system including a powered central station and a passive distant station, said central station comprising a pulsed amplitude-modulated transmitter, a receiver, and means for disabling said receiver during the intervals when energy is being emitted by said transmitter; said distant station comprising a receiver including a delay line, and means for remodulating and retransmitting the energy received from said central station, the power for operation of said distant station being substantially entirely derived from the energy received from said powered central station.

7. A radio transmission system including a central station and a distant station, said central station comprising a pulsed transmitter, a receiver, and means for disabling said receiver during the intervals when energy is being emitted by said transmitter; said distant station comprising a receiver for receiving the energy from said central station, and means for modulating the received energy and for retransmitting the same, the power for operation of said distant station being substantially entirely derived from the energy received from said central station.

8. A communication system which requires no power at the second of two points, comprising a pulsed transmitter located at the first point, an amplitude modulator connected to the pulsed transmitter, a transmit-receive box connected to the pulsed transmitter, a first antenna connected to the transmit-receive box, an amplitude modulation receiver connected to the transmit-receive box, a hybrid coil connected to the receiver and the amplitude modulator, a second antenna located at the second point, first switching means connected to the second antenna, a delay line connected to the first switching means, second switching means connected to the delay line, a tuned circuit connected to the second switching means, four rectifiers connected to form a loop, first alternate connection points between the rectifiers connected to the tuned circuit, second alternate connection points between the rectifiers connected to dynamic receiving and transmitting means, and no power source required at the second point.

9. The apparatus according to claim 8 wherein the dynamic receiving and transmitting means are connected in series and comprise respectively a telephone receiver and a dynamic microphone.

References Cited in the file of this patent

UNITED STATES PATENTS

| | | |
|---|---|---|
| 1,744,036 | Brard | Jan. 21, 1930 |
| 1,974,184 | Haigis | Sept. 18, 1934 |
| 2,193,102 | Koch | Mar. 12, 1940 |
| 2,199,179 | Koch | Apr. 30, 1940 |
| 2,212,110 | Benermann | Aug. 20, 1940 |
| 2,407,199 | Wolff | Sept. 3, 1946 |
| 2,425,314 | Hansel | Aug. 12, 1947 |
| 2,459,811 | Grieg | Jan. 25, 1949 |
| 2,475,127 | Carlson | July 5, 1949 |
| 2,511,409 | Mayberry | June 13, 1950 |
| 2,595,141 | Herbst | Apr. 29, 1952 |
| 2,695,926 | Sziklai | Nov. 30, 1954 |